US008525467B2

(12) United States Patent
Gee et al.

(10) Patent No.: US 8,525,467 B2
(45) Date of Patent: Sep. 3, 2013

(54) PHASE DELAYED ACTIVE MOTOR DAMPING TO MITIGATE ELECTRIC VEHICLE DRIVELINE OSCILLATIONS

(75) Inventors: Thomas Scott Gee, Canton, MI (US); Jonathan Andrew Butcher, Farmington, MI (US); William David Treharne, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 330 days.

(21) Appl. No.: 13/088,479

(22) Filed: Apr. 18, 2011

(65) Prior Publication Data

US 2012/0262102 A1 Oct. 18, 2012

(51) Int. Cl.
*G05D 23/275* (2006.01)

(52) U.S. Cl.
USPC .......................................... 318/632; 318/629

(58) Field of Classification Search
USPC .......................................... 318/632, 629, 114
See application file for complete search history.

(56) References Cited

U.S. PATENT DOCUMENTS

| | | | | |
|---|---|---|---|---|
| 6,196,345 B1 * | 3/2001 | Lyons et al. | | 180/65.8 |
| 6,490,518 B1 * | 12/2002 | Walenty et al. | | 701/71 |
| 6,574,535 B1 * | 6/2003 | Morris et al. | | 701/22 |
| 7,024,290 B2 * | 4/2006 | Zhao et al. | | 701/22 |

* cited by examiner

*Primary Examiner* — Rina Duda
(74) *Attorney, Agent, or Firm* — David B. Kelley; Brooks Kushman P.C.

(57) ABSTRACT

An active motor damping system and method for dampening oscillations of a driveline in a vehicle includes generating a commanded torque indicative of an actual torque which would counteract the oscillations if delivered by a motor to the driveline. The commanded torque is adjusted as a function of a phase lag between the commanded torque and an actual torque which the motor would deliver in response to the commanded torque such that in response to the adjusted commanded torque the motor delivers the actual torque which counteracts the oscillations.

14 Claims, 4 Drawing Sheets

PHASE DELAYED ACTIVE MOTOR DAMPING TO MITIGATE ELECTRIC VEHICLE DRIVELINE OSCILLATIONS

TECHNICAL FIELD

The present invention relates to a motor control system and method for mitigating unwanted electric vehicle driveline oscillations.

BACKGROUND

The term "electric vehicle" used herein encompasses vehicles such as battery electric vehicles (BEV), hybrid electric vehicles (HEV), and plug-in hybrid electric vehicles (PHEV). A BEV includes an electric motor, wherein the energy source for the motor is a battery that is re-chargeable from an external electric grid. In a BEV, the battery is the source of energy for vehicle propulsion. A HEV includes an internal combustion engine and an electric motor, wherein the energy source for the engine is fuel and the energy source for the motor is a battery. In a HEV, the engine is the main source of energy for vehicle propulsion with the battery providing supplemental energy for vehicle propulsion (the battery buffers fuel energy and recovers kinematic energy in electric form). A PHEV is like a HEV, but the PHEV has a larger capacity battery that is rechargeable from the external electric grid. In a PHEV, the battery is the main source of energy for vehicle propulsion until the battery depletes to a low energy level at which time the PHEV operates like a HEV for vehicle propulsion.

As such, an electric vehicle has an electric motor and a battery. The motor is interposed between the battery and a drive shaft of the vehicle, wherein the motor is mechanically coupled to the driveline of the vehicle. The motor may be controlled to contribute positive wheel torque to the wheels of the vehicle in order to drive the wheels for vehicle propulsion. Conversely, the motor may be controlled to contribute negative wheel torque to the wheels in order to brake the wheels for vehicle braking.

During vehicle braking, interactions between an antilock braking system (ABS) of the vehicle, the motor, the driveline, and the road surface can result in deflections in the driveline (i.e., driveline oscillations). The driveline oscillations can cause unpleasant noise, vibration, and harshness (NVH) and can damage driveline and transmission components and/or the motor.

In particular, the motor, driveline and transmission components such as the gear box and the half shafts, and the wheels combine to create a torsional mass spring configuration. The spring configuration has a resonant frequency corresponding to the mass of the motor, the gear ratio of the transmission, and the stiffness of the wheels, the half shafts, and the gear box. The oscillation frequency of the driveline oscillations is this resonant frequency.

Active motor damping is a control algorithm for reducing driveline oscillations. An active motor damping system controls the motor to output a counter-torque to the wheels in order to damp out the driveline oscillations, particularly during an ABS operation. The active motor damping system anticipates the driveline oscillations based on the motor speed and the wheel speeds. The active motor damping system can successfully quell the driveline oscillations when the response time of the system is adequate given the oscillation frequency. However, the active motor damping system can actually worsen the driveline oscillations when the response time of the system is not adequate given the oscillation frequency.

SUMMARY

In an embodiment, a method for dampening oscillations of a driveline in a vehicle is provided. The method includes generating a commanded torque indicative of an actual torque which would counteract the oscillations if delivered by a motor to the driveline. The commanded torque is adjusted as a function of a phase lag between the commanded torque and an actual torque which the motor would deliver in response to the commanded torque such that in response to the adjusted commanded torque the motor delivers to the driveline the actual torque which counteracts the oscillations.

In an embodiment, a system having a motor and a motor controller is provided. The motor is configured to deliver an actual motor torque to a driveline of the vehicle. The motor controller is configured to: generate a commanded torque indicative of an actual torque which would counteract the oscillations if delivered by the motor to the driveline; adjust the commanded torque as a function of a phase lag between the commanded torque and an actual torque which the motor would deliver in response to the commanded torque such that in response to the adjusted commanded torque the motor delivers to the driveline the actual torque which counteracts the oscillations; and provide the adjusted commanded torque to the motor.

In an embodiment, a method for reducing driveline oscillations is provided. This method includes adjusting a commanded torque indicative of an actual torque which counteracts the oscillations if delivered by a motor. The commanded torque is adjusted as a function of a phase lag between the commanded torque and an actual torque which the motor would deliver in response to the commanded torque such that in response to the adjusted commanded torque the motor delivers the actual torque which counteracts the oscillations.

DETAILED DESCRIPTION

Figure 1:
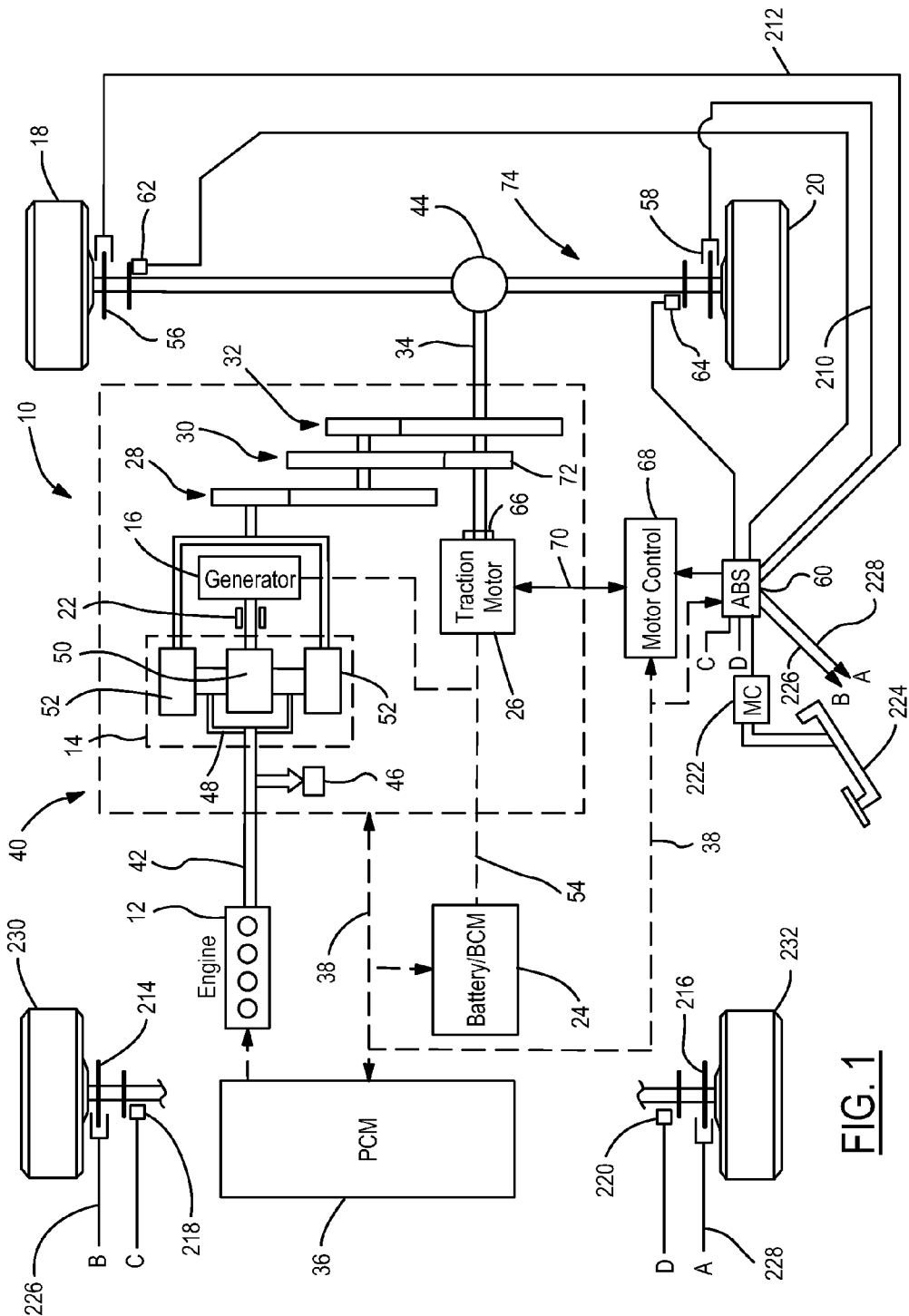
FIG. 1 illustrates a block diagram of a hybrid electric vehicle (HEV) powertrain capable of embodying the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As indicated above, an active motor damping system controls the motor of an electric vehicle to output a counter-torque to the wheels in order to damp out driveline oscillations, particularly during an ABS operation. During active motor damping, the active motor damping system looks for differences between the motor speed and the wheel speeds. Certain differences are an indication of driveline "windup" (i.e., driveline deflections). When a driveline windup is detected, a motor controller of the active motor damping system commands a counteracting motor torque to slow the motor in order to reduce the driveline windup. This works well if the wheel speeds are provided at a high enough rate and the motor controller and the motor can respond fast enough to prevent a phase lag between the commanded motor torque from the motor controller and the actual motor torque delivered by the motor.

For many electric vehicles, the resonant frequency of the powertrain system, and thus the oscillation frequency of the driveline oscillations, is in the range such as, for example, 6-10 Hz or 6-12 Hz. In this case, the oscillation frequency is within the response capability of the motor controller and the motor such that there is no more than minimal non-problematic phase lag between the commanded motor torque from the motor controller and the actual motor torque delivered by the motor. As a result, the actual motor torque delivered by the motor counteracts the driveline oscillations such that the driveline oscillations are reduced.

However, for other electric vehicles, the resonant frequency of the powertrain system, and thus the oscillation frequency of the driveline oscillations, is greater than the upper range limit such as, for example, 10 Hz or 12 Hz. In this case, the oscillation frequency is beyond the response capability of the motor controller and the motor. As a result, there may be a phase lag falling within the range of 90 to 270 degrees between the commanded motor torque from the motor controller and the actual motor torque delivered by the motor. When there is such a phase lag, the actual motor torque delivered by the motor augments the driveline oscillations such that the driveline oscillations are amplified as opposed to being reduced.

Embodiments of the present invention are directed to a phase delayed active motor damping system and method for reducing the driveline oscillations. In embodiments of the present invention, when there would otherwise be a problematic phase lag falling within the range of 90 to 270 degrees between the commanded motor torque from the motor controller and the actual motor torque delivered by the motor, the commanded motor torque is phase delayed such that the resulting actual motor torque counteracts the driveline oscillations, as opposed to otherwise augmenting the driveline oscillations, and thereby reduces the driveline oscillations.

Referring now to FIG. 1, a block diagram of a hybrid electric vehicle (HEV) powertrain 10 capable of embodying the present invention is shown. Powertrain 10 generally includes an internal combustion engine 12, an electric traction battery 24, and a transmission 40 having a planetary gear arrangement 14, a generator 16, and an electric traction motor 26. Powertrain 10 further includes a phase delayed active motor damping system having a motor controller 68.

Engine 12 is connected via an input shaft 42 to planetary arrangement 14. Planetary arrangement 14 mechanically couples a carrier gear 48 to input shaft 42 via a one-way clutch 46. Planetary arrangement 14 also mechanically couples a sun gear 50 to generator 16 and to a ring (output) gear 52. Generator 16 is connected to a generator brake 22 and a first gear set 28. Thus, planetary arrangement 14 splits engine output power into a series path from engine 12 to generator 16 and a parallel path from engine 12 to drive wheels 18, 20. The engine speed (RPM) can be controlled by varying the split to the series path, while maintaining the mechanical connection through the parallel path.

Generator 16 is electrically connected to battery 24 through a high-voltage bus 54 and is capable of receiving electrical energy from or providing electrical energy to battery 24. Motor 26 is likewise electrically connected to battery 24 through high-voltage bus 54 and is capable of receiving electrical energy from or providing electrical energy to battery 24.

Motor 26 is mechanically coupled to a gear 72 of second gear set 30. Motor 26 augments engine 12 on the parallel path through second gear set 30. A third gear set 32 is connected to second gear set 30 and to an output driveshaft 34. Output driveshaft 34 is mechanically coupled to differential 44 associated with a front axle 74 having driven wheels 18, 20. Gear 72 of second gear set 30 and motor 26 are mechanically coupled to drive wheels 18, 20 via output driveshaft 34. As such, motor 26 also provides the opportunity to use energy directly from the series path, essentially drawing from the power created by generator 16. This reduces losses associated with converting energy into and out of chemical energy in battery 24 and allows all engine energy, minus conversion losses, to reach drive wheels 18, 20.

Powertrain 10 may be under the control of a powertrain control module (PCM) 36. PCM 36 is a controller which may be in the form of an electronic module. Controller 36 processes certain data to control various aspects of powertrain system operation via a communication bus 38.

Transmission 40 may be an automatic transmission such as a "step ratio" planetary gear transmission or a continuously-variable transmission (not shown). In FIG. 1, transmission 40 is a transaxle for a front wheel drive vehicle. Transmission 40 drives driveshaft 34 coupled to drive wheels 18, 20 through a differential 44 and transmission 40 is driven by input shaft 42 interposed between engine 12 and transmission 40.

An electric drive vehicle typically employs some form of mechanical service brakes, such as friction brakes 56, 58, 214, 216 at individual wheels 18, 20, 230, 232, respectively.

The mechanical friction brakes may be hydraulic-, pneumatic-, or electric-operated. An electronic brake controller (not shown) may be used to apply relative proportions of regenerative braking and friction braking when braking is desired.

Brakes 56, 58, 214, 216 are in communication with a master cylinder 222 that receives a brake signal from a brake pedal 224. Master cylinder 222 and the brakes are in further communication with an antilock braking system (ABS) controller 60 via a plurality of brake lines, shown in FIG. 1 as front and rear brake lines (210, 212, and 226, 228, respectively).

The braking system includes an antilock capability embodied in an ABS that is effective to sense incipient wheel lock-up and modulate the application of brakes 56, 58, 214, 216 in a way that seeks to avoid wheel lock-up and resulting skidding that could possibly lead to loss of vehicle control during certain braking operations.

ABS controller 60 receives ABS event data from master cylinder 222, brake lines 210, 212, 226, 228, and from at least one wheel speed sensor selected from rear wheel speed sensors 218, 220 and front wheel speed sensors 62, 64. Wheels 230, 232 are shown in FIG. 1 as being in communication with ABS controller 60 via links A, B, C, and D.

For purposes of illustration, in a two-wheel drive configuration as shown in FIG. 1, wheels 230, 232 are non-driven wheels and wheels 18, 20 are driven wheels. However, in a four-wheel or all-wheel drive configuration, wheels 230, 232 may also be driven wheels. In the embodiment shown in FIG. 1, driven wheels 18, 20 are steerable and are positioned toward the front of the vehicle while non-driven wheels 230, 232 are positioned toward the rear of the vehicle. In a front wheel drive arrangement, wheel speed sensors 62, 64 sense the rotational wheel speeds of driven wheels 18, 20. Additionally, in a rear or all-wheel drive vehicle, wheel speed sensors 218, 220 sense the rotational speeds of wheels 230, 232.

A motor speed sensor 66 associated with motor 26 senses the rotational speed of motor 26. The motor speed signal from motor speed sensor 66 and the wheel speed signals from the wheel speed sensors are made available to motor controller 68. The motor speed signal is made available to motor controller 68 via hard-wiring 70 between motor speed sensor 66 and motor controller 68. The wheel speed signals are made available to motor controller 68 through a data communication link from ABS controller 68 to which the wheel speed sensors are directly coupled.

At certain times, motor 26 may operate as a "motor" that makes a positive torque contribution to powertrain torque. Positive torque contribution from motor 26 may appear as motor torque delivered through a drivetrain of the vehicle to at least some of the wheels to propel the vehicle. At other times, motor 26 operates as a generator that makes a negative torque contribution to powertrain torque. Negative torque contribution from motor 26 imposes braking torque on the drivetrain to brake the vehicle.

Motor 26 may be any electric machine design that operates to drive at least one drive wheel in a vehicle. As shown in FIG. 1, motor 26 provides a drive force (i.e., a motor torque) to drive two drive wheels. Motor controller 68 controls motor 26 by issuing motor torque commands to motor 26. In response to a commanded motor torque, motor 26 generates an actual motor torque corresponding to the commanded motor torque. Motor controller 68 can receive input from various vehicle component sensors including: wheel speed sensor selected from wheel speed sensors 62, 64, 218, 220, motor speed sensor 66, and ABS operation data. Motor controller 68 can be physically located either within PCM 36 or as a stand-alone unit (as shown in FIG. 1).

Motor controller 68 correspondingly generates a commanded or desired motor torque corresponding to at least one of motor speed, motor acceleration, wheel speed, wheel acceleration, a difference in motor speed and wheel speed, and a difference in motor acceleration and wheel acceleration during vehicle braking such as an ABS braking operation. Motor 26 delivers an actual motor torque in response to receiving the commanded motor torque from motor controller 68.

Thus, motor 26 can be positioned to provide a driving motor torque to differential 44 in an embodiment in which motor 26 is associated with driving at least two drive wheels 18, 20. Alternatively, motor 26 can be positioned to directly drive at least one drive wheel. Motor 26 can apply torque corrections in accordance with a commanded motor torque from motor controller 68 to suppress or cancel the torque oscillations occurring in the driveline due to motor inertia of motor 26 (i.e., to "actively damp" the driveline oscillations). Motor controller 68 may control motor 26 anytime during vehicle operation including during an occurrence of an ABS braking operation.

As indicated above, the oscillation frequency of the driveline oscillations may be within the response capability of motor controller 68 and motor 26 (e.g., motor 26 and an associated inverter) such that there is no more than minimal non-problematic phase lag between the commanded motor torque from motor controller 68 and the actual motor torque delivered by motor 26. As a result, the actual motor torque delivered by motor 26 counteracts the driveline oscillations such that the driveline oscillations are reduced.

Figure 2A:
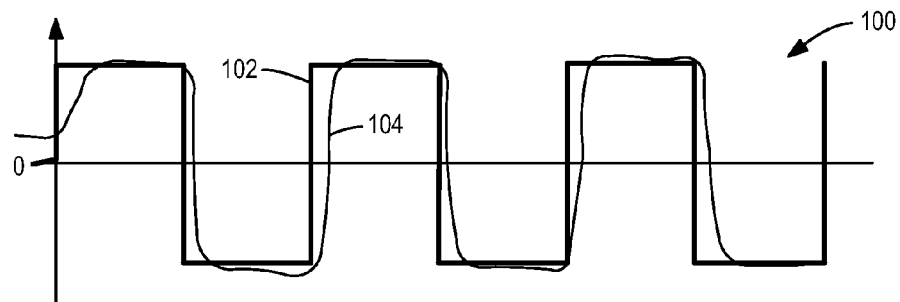
FIG. 2A illustrates a plot of the commanded motor torque from a motor controller and the actual motor torque delivered by a motor during an active motor damping operation in which the oscillation frequency of driveline oscillations is within the response capability of the motor controller and the motor.
Figure 2B:
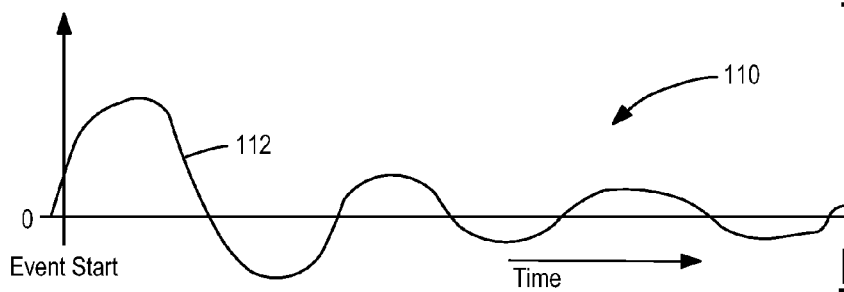
FIG. 2B illustrates a plot of the driveline oscillations as effected by the actual motor torque shown in FIG. 2A during the active motor damping operation.

Referring now to FIGS. 2A and 2B, with continual reference to FIG. 1, a plot 100 of commanded motor torque 102 from motor controller 68 and actual motor torque 104 delivered by motor 26 during an active motor damping operation in which the oscillation frequency of driveline oscillations 112 is within the response capability of motor controller 68 and motor 26 and a plot 110 of driveline oscillations 112 as effected by actual motor torque 104 during the active motor damping operation are respectively shown. As can be seen in FIG. 2A, actual motor torque 104 for the most part matches commanded motor torque 102 with just a slight lag. As can be seen in FIG. 2B, driveline oscillations 112 are reduced over time in response to being effected by actual motor torque 104. Thus, actual motor torque 104 delivered by motor 26 in response to commanded motor torque 102 from motor controller 68 counteracts driveline oscillations 112 such that driveline oscillations 112 are reduced.

As further indicated above, the oscillation frequency of the driveline oscillations may be beyond the response capability of motor controller 68 and motor 26. As a result, there may be a phase lag falling within the range of 90 to 270 degrees between the commanded motor torque from motor controller 68 and the actual motor torque delivered by motor 26. When there is such a phase lag, the actual motor torque delivered by motor 26 augments the driveline oscillations such that the driveline oscillations are amplified as opposed to counteracting the driveline oscillations such that the driveline oscillations are reduced.

Figure 3A:
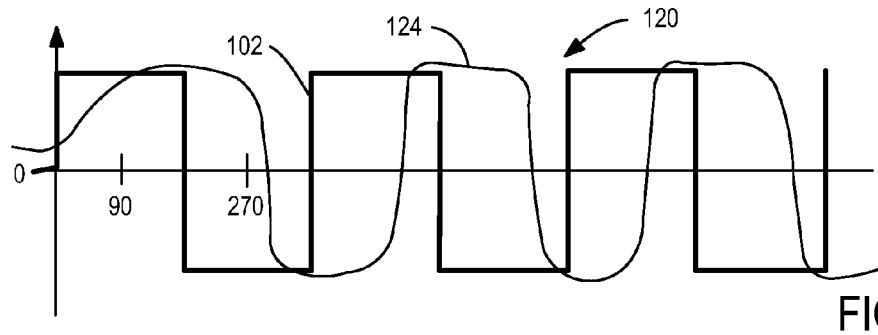
FIG. 3A illustrates a plot of the commanded motor torque from the motor controller and the actual motor torque delivered by the motor during an active motor damping operation in which the oscillation frequency of driveline oscillations is beyond the response capability of the motor controller and the motor.
Figure 3B:
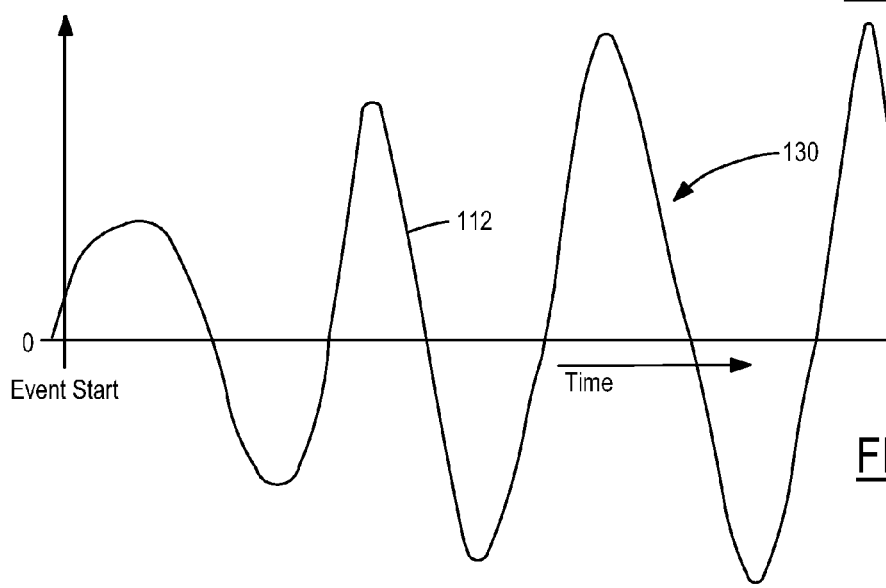
FIG. 3B illustrates a plot of the driveline oscillations as effected by the actual motor torque shown in FIG. 3A during the active motor damping operation.

Referring now to FIGS. 3A and 3B, with continual reference to FIG. 1, a plot 120 of commanded motor torque 102 from motor controller 68 and actual motor torque 124 delivered by motor 26 during an active motor damping operation in which the oscillation frequency of driveline oscillations 112 is beyond the response capability of motor controller 68 and motor 26 and a plot 130 of driveline oscillations 112 as effected by actual motor torque 124 during the active motor damping operation are respectively shown. As can be seen in FIG. 3A, actual motor torque 124 lags commanded motor torque 102 by about 100 degrees. As such, there is a phase lag falling within the range of 90 to 270 degrees between commanded motor torque 102 and actual motor torque 124. As can be seen in FIG. 3B, driveline oscillations 112 are amplified over time in response to being effected by actual motor torque 124. Thus, actual motor torque 124 delivered by motor 26 in response to commanded motor torque 102 from motor controller 68 augments driveline oscillations 112 such that driveline oscillations 112 are amplified as opposed to being reduced.

As also indicated above, embodiments of the present invention are directed to a phase delayed active motor damping system and method for reducing driveline oscillations. In embodiments of the present invention, when there would otherwise be a problematic phase lag falling within the range of 90 to 270 degrees between the commanded motor torque from motor controller 68 and the actual motor torque delivered by motor 26, the commanded motor torque is phase delayed such that the resulting actual motor torque counteracts the driveline oscillations, as opposed to otherwise augmenting the driveline oscillations, and thereby reduces the driveline oscillations.

Figure 4:
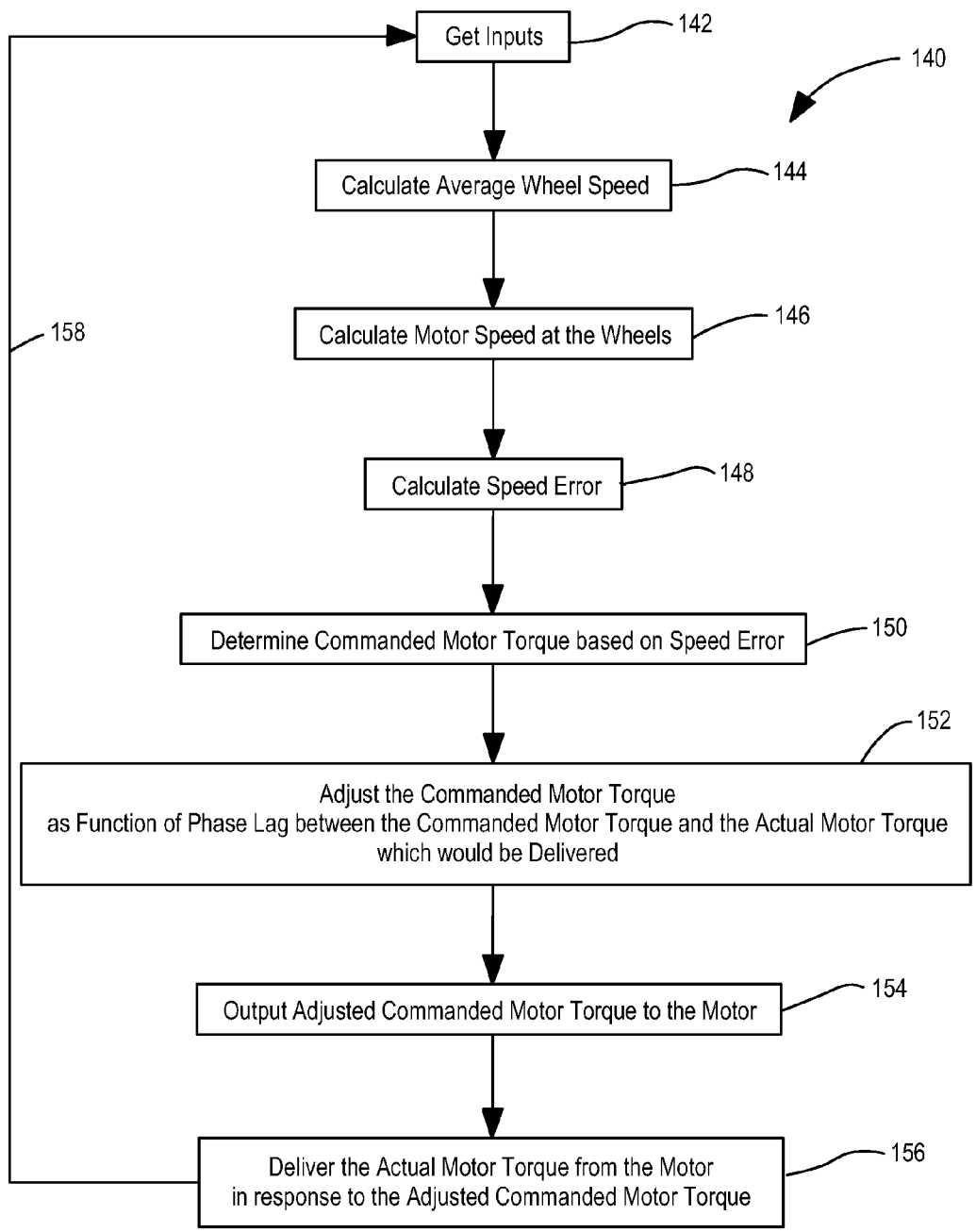
FIG. 4 illustrates a flowchart describing operation of a phase delayed active motor damping system and method in accordance with an embodiment of the present invention.

Referring now to FIG. 4, with continual reference to FIG. 1, a flowchart 140 describing operation of a phase delayed active motor damping system and method in accordance with an embodiment of the present invention is shown. The operation occurs during an active motor damping operation and begins with motor controller 68 receiving as inputs the speed of motor 26 and the wheel speeds as indicated in block 142. The average wheel speed (AWS) is determined in block 144 by summing the rotational speeds of each motor driven wheel sensed and dividing the sum by the number of wheels sensed. The motor speed at the wheels (MSW) is determined by dividing the speed of motor 26 by a predetermined gear ratio as indicated in block 146. A speed error (SE) is determined based on the difference between the motor speed at the wheels and the average wheel speed as indicated in block 148. The speed error reflects driveline oscillations.

A commanded motor torque based on the driveline oscillations is generated by motor controller 68 as indicated in block 150. The commanded motor torque generated in block 150 represents the actual motor torque which would counteract the driveline oscillations if delivered by motor 26. That is, if the actual motor torque delivered by motor 26 matched the commanded motor torque generated in block 150 (such as the case in FIG. 2A), then the actual motor torque would counteract the driveline oscillations (such as the case in FIG. 2B). However, the operation of the phase delayed active motor damping system and method is applicable to the situation in which there is a phase lag falling within the range of 90 to 270 degrees between the commanded motor torque generated in block 150 and the actual motor torque delivered by motor 26. This phase lag between the commanded motor torque generated in block 150 and the actual motor torque delivered by motor 26 is due to the oscillation frequency of the driveline oscillations being beyond the response capability of motor controller 68 and motor 26 (such as the case in FIG. 3A). Thus, in this situation, the actual motor torque delivered by motor 26 in response to the commanded motor torque generated in block 150 would augment the driveline oscillations (such as the case in FIG. 3B).

Accordingly, as indicated in block 152, the commanded motor torque generated in block 150 is adjusted as a function of the phase lag between the commanded motor torque and the resulting actual motor torque which would otherwise be delivered by motor 26 if the commanded motor torque were not adjusted. In particular, the commanded motor torque generated in block 150 is adjusted with the addition of a time delay in block 152 such that the resulting actual motor torque delivered by motor 26 counteracts, as opposed to otherwise augmenting, the driveline oscillations. As such, the adjusted commanded motor torque generated in block 152 is a phase delayed version of the commanded motor torque generated in block 150. The amount of the time delay (i.e., phase delay adjustment) may be determined based on the known resonant frequency of the powertrain system and the known response capability of motor controller 68 and motor 26. In any event, the commanded motor torque generated in block 150 is adjusted in block 152 such that the resulting actual motor torque delivered by motor 26 produces the same effect as when the actual motor torque delivered by motor 26 generally matches the commanded motor torque generated in block 150. FIG. 2A illustrates an example of when the actual motor torque delivered by motor 26 generally matches the commanded motor torque generated in block 150. In turn, motor controller 68 outputs the adjusted commanded motor torque to motor 26 as indicated in block 154. Motor 26 then delivers an actual motor torque to a drivetrain element such as differential 44 or the like in response to the adjusted commanded motor torque as indicated in block 156. After motor 26 delivers the actual motor torque, the operation is repeated as indicated by 158.

Figure 5A:
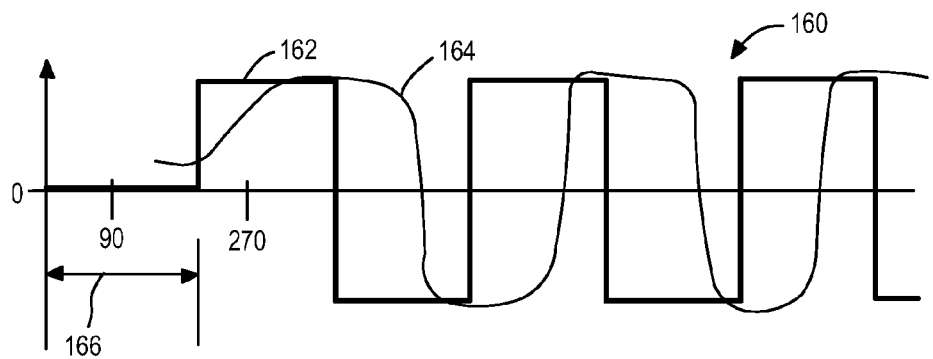
FIG. 5A illustrates a plot of a phase delayed commanded motor torque from the motor controller and the actual motor torque delivered by the motor during an active motor damping operation in accordance with an embodiment of the present invention.
Figure 5B:
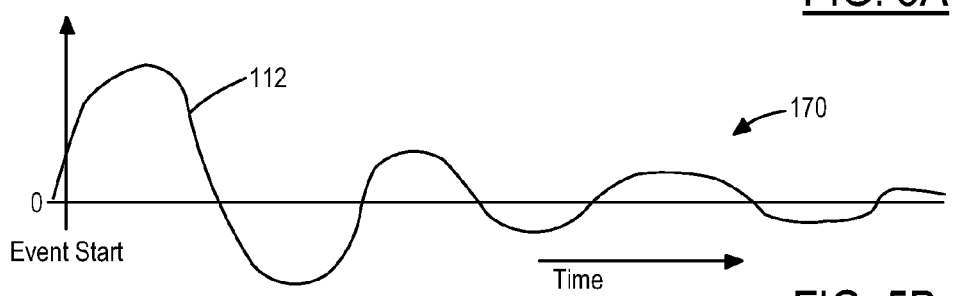
FIG. 5B illustrates a plot of the driveline oscillations as effected by the actual motor torque shown in FIG. 5A during the active motor damping operation.

Referring now to FIGS. 5A and 5B, with continual reference to FIGS. 1 and 4, a plot 160 of a phase delayed commanded motor torque 162 from motor controller 68 and actual motor torque 164 delivered by motor 26 during an active motor damping operation in accordance with an embodiment of the present invention and a plot 170 of driveline oscillations 112 as effected by actual motor torque 164 during the active motor damping operation are respectively shown. As can be seen from FIG. 5A, phase delayed commanded motor torque 162 has been adjusted with a time delay 166 for phase alignment between actual motor torque 164 and driveline oscillations 112. That is, phase delayed commanded motor torque 162 has been adjusted with time delay 166 in order to bring actual motor torque 164 in-phase with driveline oscillations 112. As a result, actual motor torque 164 counteracts driveline oscillations 112 and thereby minimizes or mitigates driveline oscillations 112. This can be seen in FIG. 5B which shows driveline oscillations 112 being reduced over time in response to being effected by actual motor torque 164. Thus, actual motor torque 164 delivered by motor 26 in response to phase delayed commanded motor torque 162 from motor controller 68 counteracts driveline oscillations 112 such that driveline oscillations 112 are reduced. Without the commanded motor torque being adjusted by the time delay, the resulting actual motor torque delivered by motor 26 would amplify driveline oscillations as illustrated in FIG. 3B.

FIGS. 5A and 5B are indicative of a scenario in which a phase lag is introduced to the commanded motor torque to produce a phase delayed commanded motor torque which brings the actual motor torque delivered by motor 26 in-phase with driveline oscillations 112 to thereby effectively quell driveline oscillations 112. This phase lag can be introduced as the powertrain system responds at its resonant frequency and is fairly independent of the forcing frequency.

Figure 6A:
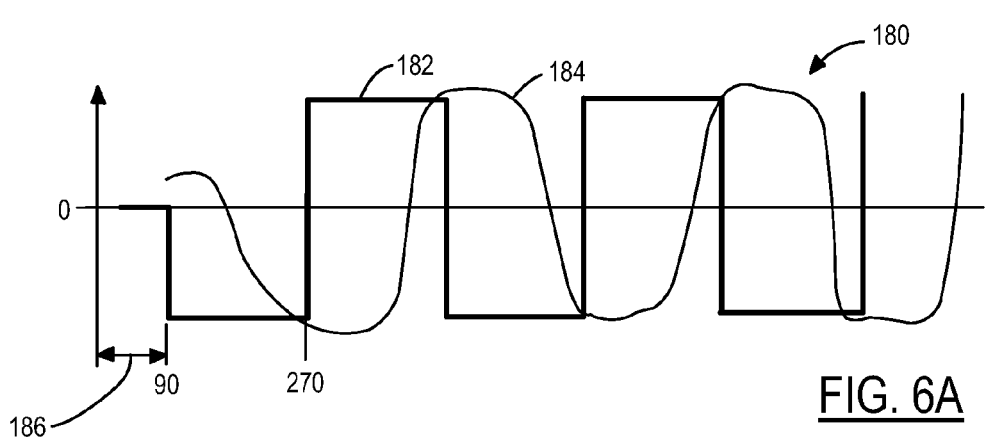
FIG. 6A illustrates a plot of a phase delayed and inverted commanded motor torque from the motor controller and the actual motor torque delivered by the motor during an active motor damping operation in accordance with an embodiment of the present invention.
Figure 6B:
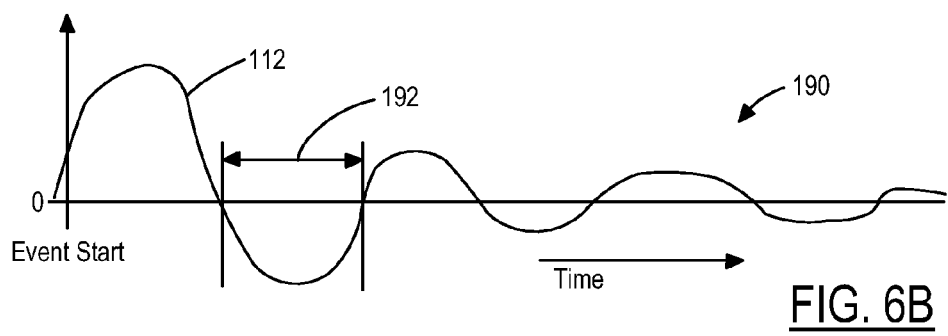
FIG. 6B illustrates a plot of the driveline oscillations as effected by the actual motor torque shown in FIG. 6A during the active motor damping operation.

Referring now to FIGS. 6A and 6B, with continual reference to FIGS. 1 and 4, a plot 180 of a phase delayed and inverted commanded motor torque 182 from motor controller 68 and actual motor torque 184 delivered by motor 26 during an active motor damping operation in accordance with an embodiment of the present invention and a plot 190 of driveline oscillations 112 as effected by actual motor torque 184 during the active motor damping operation are respectively shown. As can be seen from FIG. 6A, phase delayed and inverted commanded motor torque 182 has been adjusted with a time delay 186 for phase alignment between actual motor torque 184 and driveline oscillations 112 and has been further adjusted to be inverted. As a result, actual motor torque 184 counteracts driveline oscillations 112 in order to reduce driveline oscillations 112. This can be seen in FIG. 6B which shows driveline oscillations 112 being reduced over time in response to being effected by actual motor torque 184. Thus, actual motor torque 184 delivered by motor 26 in response to phase delayed and inverted commanded motor torque 182 from motor controller 68 counteracts driveline oscillations 112 such that driveline oscillations 112 are reduced.

FIGS. 6A and 6B are indicative of a scenario in which, in addition to a phase lag being introduced to the commanded motor torque, the commanded motor torque is inverted. This causes the resulting actual motor torque delivered by motor 26 to be able to act on the second half of the first driveline oscillation waveform indicated at 192.

In accordance with embodiments of the present invention, there are several ways to introduce the phase modification for generating adjusted commanded motor torque from the commanded motor torque. For instance, a calibrateable time delay (or a number of control loops) may be added to the commanded motor torque. As another example, phase lag may be created by delaying the communication of the wheel speed measurements to the motor controller. The issue of re-propagating the driveline oscillations due to continued motor torque pulses at the end of the event can be addressed in several ways. For instance, the application of the torque pulses is stopped in response to a flag indicative of termination of an ABS operation being generated. Other methods may include measuring the amplitude of the driveline oscillations and/or of the difference between the motor speed and wheel speeds and to cease application of the motor torque pulses when the amplitude declines below a given threshold.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for reducing vehicle driveline oscillations, comprising:
adjusting a commanded torque, indicative of an actual torque which counteracts the oscillations if delivered by a motor, with a time delay as a function of a phase lag between the commanded torque and an actual torque which the motor would deliver in response to the commanded torque such that in response to the adjusted commanded torque the motor delivers the actual torque which counteracts the oscillations.

2. The method of claim 1 wherein the oscillations have a frequency, wherein:
the amount of the time delay added to the commanded torque is based on the frequency of the oscillations.

3. The method of claim 1 wherein:
the amount of the time delay added to the commanded torque is based on a response capability of the motor.

4. The method of claim 1 wherein:
the step of adjusting is repeated until the oscillations are reduced below a minimum threshold.

5. The method of claim 1 wherein:
the step of adjusting is performed during an antilock braking operation.

6. The method of claim 1 wherein:
the commanded torque is adjusted as a function of the phase lag when the phase lag falls within a range of 90 to 270 degrees.

7. A system comprising:
a motor configured to deliver an actual torque to a driveline of the vehicle; and
a motor controller configured to generate a commanded torque indicative of an actual torque which would counteract the oscillations if delivered by the motor to the driveline, adjust the commanded torque as a function of a phase lag between the commanded torque and an actual torque which the motor would deliver in response to the commanded torque such that in response to the adjusted commanded torque the motor delivers to the driveline the actual torque which counteracts the oscillations, and provide the adjusted commanded torque to the motor;
wherein the motor controller is further configured to adjust the commanded torque by adding a time delay to the commanded torque such that the adjusted commanded torque is a phase-delayed version of the commanded torque.

8. The system of claim 7 wherein:
the motor controller is further configured to adjust the commanded torque as a function of the phase lag when the phase lag falls within a range of 90 to 270 degrees.

9. The system of claim 7 wherein the oscillations have a frequency, wherein:
the amount of the time delay added to the commanded torque is based on the frequency of the oscillations.

10. The system of claim 7 wherein:
the amount of the time delay added to the commanded torque is based on a response capability of the motor.

11. The system of claim 7 wherein:
the motor controller is further configured to adjust the commanded torque by adding a time delay to the commanded torque and inverting the commanded torque such that the adjusted commanded torque is a phase-delayed version of the commanded torque.

12. The system of claim 7 wherein:
the motor controller is further configured to perform the generating, adjusting, and providing operations until the oscillations are reduced below a minimum threshold.

13. The system of claim 7 wherein:
the motor controller is further configured to perform the generating, adjusting, and providing operations during an antilock braking operation.

14. The system of claim 7 wherein:
the vehicle is an electric vehicle.

* * * * *